United States Patent [19]

Huiber

[11] Patent Number: 4,573,343
[45] Date of Patent: Mar. 4, 1986

[54] VALVE LEAK DETECTOR

[75] Inventor: Otto A. Huiber, Kentwood, Mich.

[73] Assignee: Hi-Tech Engineering, Inc., Grand Rapids, Mich.

[21] Appl. No.: 605,203

[22] Filed: Apr. 30, 1984

[51] Int. Cl.4 ............................................. G01M 3/04
[52] U.S. Cl. .................................. 73/40; 73/40.5 R; 73/46
[58] Field of Search ............... 73/40, 40.5 R, 46, 49.2, 73/49.3; 137/557

[56] References Cited

U.S. PATENT DOCUMENTS

| | | | |
|---|---|---|---|
| 2,934,943 | 5/1960 | Carrie | 73/46 |
| 3,398,761 | 8/1968 | Grove et al. | 73/40.5 R |
| 3,543,563 | 12/1970 | Weien | 73/40 |
| 3,835,878 | 9/1974 | Braidt et al. | 73/46 X |
| 4,462,422 | 7/1984 | Owoc et al. | 73/40 X |

Primary Examiner—Thomas Wyse
Attorney, Agent, or Firm—Price, Heneveld, Huizenga & Cooper

[57] ABSTRACT

The leak detecting system comprises a housing including a conduit with an inlet for coupling to the outlet of a pressure actuated valve and an outlet for passing fluid through the leak detector during normal operation. A movable element extends in said conduit and moves upon entry of fluid therein. A sensor is coupled to the movable element and provides an alarm control signal upon detection of movement of the movable element.

14 Claims, 2 Drawing Figures

VALVE LEAK DETECTOR

BACKGROUND OF THE INVENTION

The present invention relates to valves used in high pressure applications, and particularly, a leak detector for such a valve.

In the injection of polyurethane products, high pressure and temperature of liquid chemicals are selectively supplied to a plurality of mixing chambers and subsequently injected into molds. It is important that the chemicals be supplied to a selected mixing chamber in a controlled fashion and only when the injection process is taking place. Valves such as ball valves have been inserted into series with the chemical flow path between the high pressure source and a mixing chamber. These valves are self-opening at a relatively high pressure such as 1,500 psi for allowing chemical to be introduced into a desired mixing chamber at a high pressure with the remaining valves closed to prevent undesired seepage of chemicals into conduits leading to other mixing chambers of a typical multiple head installation.

As the seats of such valves tend to wear, chemicals can seep through the valve seats and the loss of chemicals can cause an improper ratio of chemicals supplied to a mixing head resulting in faulty parts. Even a small amount of leakage through a valve can cause shut-down of an injection molding facility for repair and the loss of many parts before the problem is discovered. Naturally, as the valves wear, frequently the first indication of such wear is the failure of valuable parts.

SUMMARY OF THE PRESENT INVENTION

The system of the present invention provides a leak detector in which a pressure responsive movable element is coupled to the outlet of a control valve such that any leakage of a noncompressible fluid will cause the movable element to change position, which position change is detected and an alarm activated. When coupled to a pressure activated valve, the leak detecting structure is employed to alert maintenance personnel of leaks which may require replacement of valve seats or the like well prior to a serious seepage problem.

In the preferred embodiment of the present invention, the leak detecting system comprises a housing including a conduit with an inlet for coupling to the outlet of a pressure actuated valve and an outlet for passing fluid through the leak detector during normal operation. Movable means extend in said conduit and move upon entry of fluid therein. Sensing means coupled to the movable means provide an alarm control signal upon detection of movement of the movable means. In the preferred embodiment of the invention, the movable means includes a valve which extends in the housing to selectively seal the conduit but open the same in the presence of fluid pressure in the inlet side of the conduit.

Such a leak detector can be coupled in series with a pressure actuated valve used in a polyurethane molding system to prevent costly loss of parts and shut-down due to leaky pressure actuated valves in the system. The invention provides a relatively inexpensive system to provide signals for an alarm to alert maintenance personnel when any significant leakage takes place in the system.

These and other features, objects and advantages of the present invention will become apparent upon reading the following description thereof together with reference to the accompanying drawings in which:

DETAILED DESCRIPTION OF THE PREFERRED EMBODIMENT

Figures 1, 2:
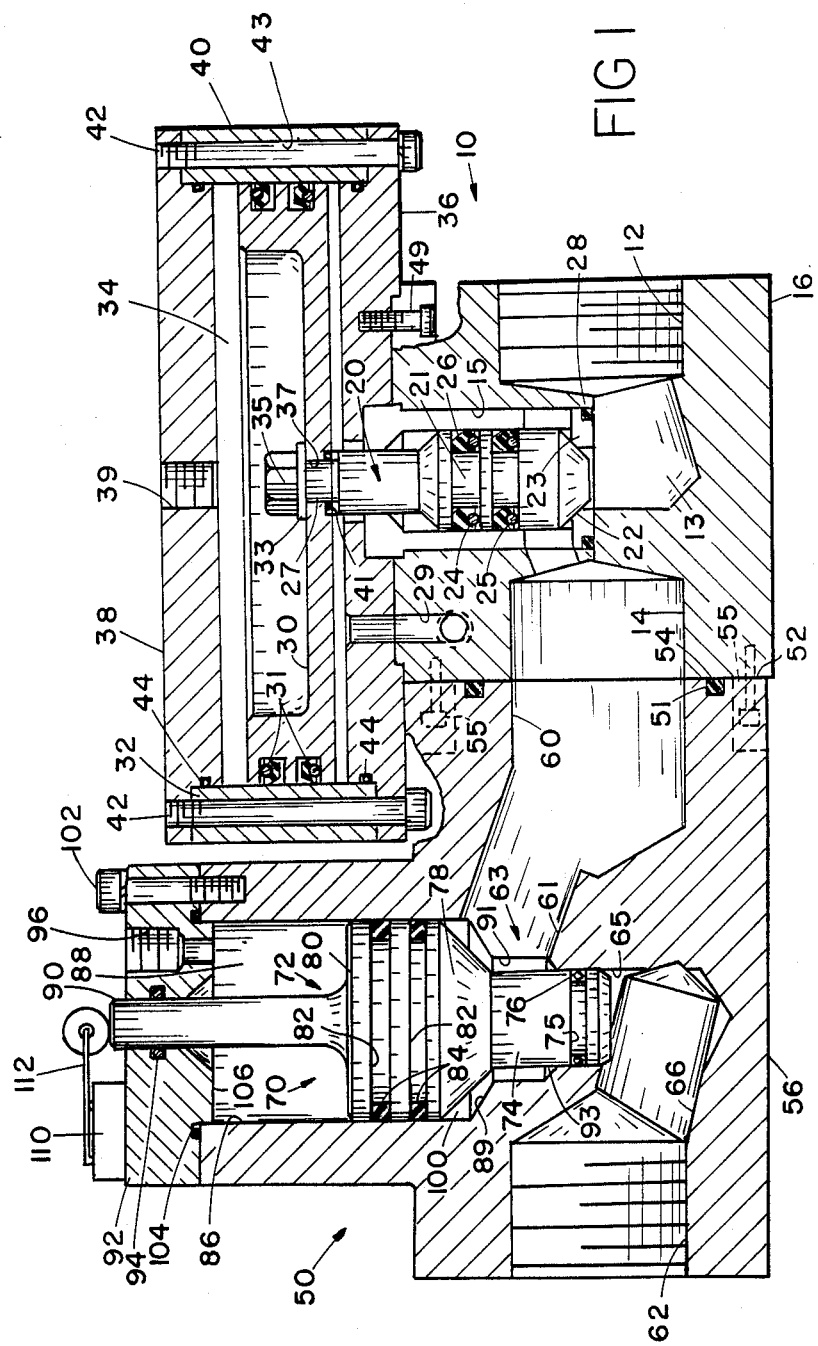
FIG. 1 is a vertical, cross-sectional view of a pressure actuated valve and leak detector embodying the present invention.
FIG. 2 is an electrical circuit diagram in block and schematic form of the alarm circuit used in conjunction with the leak detector.

Referring initially to FIG. 1, there is shown a pancake-type valve 10 for controlling the flow of a liquid from a threaded inlet 12 to an outlet 14 through valve passageway 13. The inlets, outlets and interconnecting passageway 13 are machined in a valve body 16 which also includes a vertically extending, cylindrical opening 15 extending downwardly from a top surface thereof for receiving a valve plunger assembly 20. Passageway 13 is selectively obstructed by the conically tapered end 22 of the plunger 21 which sealably seats against the valve seat 23 when in a closed position as illustrated. Plunger 21 is generally cylindrical and includes a pair of spaced annular grooves for receiving axially spaced seals 24 and 25 which sealably engage the cylindrical sleeve liner 26. The valve seat 23 is similarly sealed to the cylindrical wall 15 of the valve body by means of an O-ring seal 28. Plunger 21 is held in a closed position by a pneumatically operated piston including a cup-shaped, or pancake, piston 30 having an outer cylindrical surface sealably engaging a cylindrical liner 32 defining the sidewalls of the piston chamber 34.

Chamber 34 is defined by disc-shaped lower plate 36, a cover plate 38 and a cylindrical sidewall 40. A plurality of bolts 42 extend between plate 36 and cover 38 through apertures 43 formed in wall 40 to sealably enclose the chamber 34. Suitable O-rings 44 positioned in annular grooves sealably interconnect the cylindrical sleeve 32 with the cover plate 38 and plate 36, as illustrated. A threaded pipe fitting 39 is formed centrally at the top of plate 38 for the admission of pneumatic pressure in the range of 90 to 120 psi for holding the piston 30 downwardly with its coupled valve closed, as illustrated.

The plunger assembly 20 includes a stem 27 which extends upwardly through an aperture 37 centrally located in piston 30 and is secured thereto by means of a nut 35 threadably secured over the threaded end of stem 27 with a lock washer 33 securely holding the nut in place. An O-ring seal 41 extends around the cylindrical stem 27 at the lower end of piston 30 to prevent the leakage of any air through the stem-piston interface. The outer cylindrical wall of piston 30 includes a pair of spaced sealing rings 31 which seal the interface between piston 30 and the inner surface of cylindrical sleeve 32. Valve body 16 is secured to the lower plate 36 of the piston assembly by means of a plurality of threaded bolts 49 to mechanically interconnect the valve body 16 with the actuating piston cylinder.

Piston chamber 34 includes an upper segment communicating with inlet 39 and a lower portion on the opposite sides of seals 31 which communicate with an exhaust port 29 formed in plate 36 and through valve body 16. If desired, port 29 can be coupled to a selectively actuated source of pneumatic pressure for providing a double acting piston; however, in the preferred embodiment, port 29 is an exhaust port only.

Coupled to the outlet 14 of valve 10 is the leak detector 50 of the present invention which has a generally flat, cylindrical surface 52 with an annular groove 51 receiving a sealing O-ring 54 which engages the flat surface surrounding the cylindrical inlet 60 of detector 50 and outlet 14 of valve 10 to provide a sealed interface between the valve 10 and leak detector 50. Suitable bolts 55 threadably extend between the housing 56 of the leak detector and the body 16 of valve 10 for mechanically securing the two elements. Such bolts 55 conventionally extend through apertures formed in recesses around the inlet 60 of the leak detector 50.

Leak detector 50 also includes a threaded outlet 62 coupled to inlet 60 by a conduit 63 including an upwardly inclined inlet portion 61 which is axially offset from a similarly inclined outlet portion 66 communicating with outlet 62. Joining offset conduit segments 61 and 66 is a downwardly formed cylindrical valve seat 65 to complete the flow path in conduit 63 between inlet 60 and outlet 62. Conduit 63 is selectively obstructed by a movable means 70 including an actuator rod 72. Means 70 includes a lower cylindrical valve portion 74 having an annular groove 75 formed therein for receiving an O-ring seal 76. Seal 76 sealably engages the cylindrical valve seat 65 forming a portion of the interconnecting passageway 63 between inlet 60 and outlet 62 when in a closed position, illustrated in FIG. 1. A conically tapered transitional area 78 of means 70 couples cylindrical valve portion 74 to an integral piston 80 which includes a cylindrical body with a pair of annular slots 82 for receiving sealing rings 84 therein. Rings 84 seal the outer cylindrical portion of piston 80 to the cylindrical sidewall 86 of the piston chamber 88 formed downwardly in housing 56, as illustrated in FIG. 1.

Assembly 72 also includes an integral stem 90 which extends upwardly from the center of piston 80 and sealably extends through the top 92 of the detector 50 by means of an O-ring seal 94 fitted in an annular groove surrounding the cylindrical sides of stem 90. The piston chamber 88 includes a conically tapered passageway 89 at its lower end which communicates with conduit 63. A cylindrical passageway segment 91 extends from an end of tapered passageway 89 to a second conically tapered section 93 which in turn extends to the cylindrical valve seat 65. The diameters of the cylindrical sidewall 86, conically tapered segment 89 and cylindrical segment 91 are greater than the mean diameters of the conically tapered portion 78 of assembly 70 and the cylindrical valve 74 such that a lower piston chamber 100 is defined by the space surrounding the lower end of the piston assembly within the walls of housing 56.

Top 92 of the detector 50 is secured to housing 56 by means of a plurality of bolts 102 and sealably secured thereto by means of an O-ring seal 104 fitted in an annular groove formed in the lower surface of top 92. The top includes a cylindrical portion 106 extending downwardly slightly into the piston chamber 88. Movement of stem 90 is detected by sensing means comprising a switch 110 secured to the upper surface of top 92. Switch 110 includes a movable arm 112 extending into engagement with the end of stem 90 as shown. Switch 110 can be a conventional limit-type switch such that a relatively small (i.e., 0.005 inch) movement of stem 90 along its longitudinal axis in an upward direction can be detected by the switch 110 which provides an electrical signal, as described below in connection with FIG. 2, for providing an alarm.

The top 92 also includes an inlet 96 for receiving a threaded pneumatic fitting for applying pneumatic pressure of about 90 to 120 psi which urges piston 80 downwardly, in the position illustrated in FIG. 1. As fluid enters inlet 60 and chamber 100, however, inasmuch as the lower end of piston 80 is sealed by a ring 76 against sidewall 65, pressure will build up in chamber 100 urging the piston 80 downwardly against the bias pressure applied through inlet 96 causing the stem 90 to move upwardly which actuates switch 110. A relatively small leak of material through valve 10 is sufficient to cause pressure build-up in chamber 100 to urge piston 80 upwardly causing actuation of switch 110 well prior to the opening of valve 74.

During normal operation of valve 10 and leak detector 50, upon opening of valve 10 by the application of high pressure liquid at inlet 12, the similar pressure applied to chamber 100 through inlet 60 of the leak detector will instantaneously open valve 74 of the leak detector allowing the fluid to pass through conduit 63 to outlet 62. The outlet 62 is threaded for receiving a pipe communicating with the assembly shown in FIG. 1 and the mixing chamber associated with, for example, a polyurethane molding system.

Inasmuch as the leak detector 50 will be actuated each time valve 10 is opened normally and when an undesired leak occurs, a discriminatory electrical control system, shown in FIG. 2, is employed to provide an alarm signal only when a leak actually occurs.

FIG. 2 illustrates a control circuit used in connection with the leak detector shown in FIG. 1. For operation of the injection machine, it is assumed that a conventional electro-pneumatic or electro-hydraulic control system is used in which a signal comprising a logic "1" is generated when it is desired to inject fluid into the mixing chamber and, therefore, pressurize and open valve 10 as well as leak detector 50. In FIG. 2, an input terminal 114 is indicated as receiving such a logic "1" injection signal which occurs only upon pressurization of the source of fluid to open valve 10. Terminal 114 is coupled to one input of a NAND gate 116 which has its remaining input terminal coupled to one terminal of switch 110 which is an SPST switch having its remaining terminal coupled to a +V supply voltage which provides a logic "1" to the remaining input of NAND gate 116 when switch 110 is closed. The output terminal of NAND gate 116 is coupled to one input terminal of AND gate 118 having its remaining input terminal coupled to the output of switch 110. The output of AND gate 118 is coupled to the input of an alarm circuit 120 which responds to a logic "1" output signal from AND gate 118 to sound either an audible alarm or provide a flashing or continuous light indicating to the machine operator that a leak has been detected.

The operation of the circuit of FIG. 2 is such that under normal conditions, whenever an injection cycle takes place, switch 110 will be closed simultaneously with the receipt of an injection signal. With two logic "1"'s applied to the input of NAND gate 116, the output has a logic "0" and, therefore, the output of AND gate 118 remains at a "0". If, however, an injection signal is not present, therefore, input 114 is at a logic "0" level and a leak occurs, the remaining input of NAND gate 116 will be a logic "1" causing its output to be a logic "1". With the logic "1" output from gate 116 applied to the input of AND gate 118 and the leak detecting signal from switch 110 also applied to the remaining input of AND gate 118, the output of gate 118 will go to a logic "1" state triggering alarm 120. Thus, circuit 118 will provide an output signal only when switch 110 is closed and when there is a "0" input signal at terminal 114. Inasmuch as this occurs only when there is an undesired leak, the alarm 120 provides a reliable and unique signal indicating that valve 10 is leaking and either needs to be replaced or repaired.

The dimensions shown in FIG. 1 are scaled and it is seen that the diameter of piston 80 is sufficiently large that a realtively low liquid pressure in chamber 100 will cause movement of stem 90 to actuate switch 110. Similarly, the surface area provided by piston 30 is relatively large compared to the surface area presented by piston 80 such that the bias force against movement of stem 90 is relatively small compared to the bias force against the self-opening valve 10 which will open only upon the application of approximately 1,500 psi of liquid chemical pressure.

It will become apparent to those skilled in the art that various modifications to the preferred embodiment of the invention as described herein can be made without departing from the spirit or scope of the invention as defined by the appended claims.

The embodiments of the invention in which an exclusive porperty or privlege is claimed are defined as follows:

1. A leak detector for a valve used in a high pressure chemical injection system comprising:
    a housing including conduit means for coupling to an outlet of a valve such that fluid passing through the valve will enter said conduit, said housing including a chamber communicating with said conduit;
    piston means movably positioned in said chamber and movable in a first direction in said chamber in response to the entry of a non-compressible fluid in said condut; and
    sensor means coupled to said housing and positioned to respond to movement of said piston for providing an alarm output signal.

2. The apparatus as defined in claim 1 and further including means for urging said piston in a direction opposite said first direction in the absence of pressurized fluid in said conduit.

3. The apparatus as defined in claim 2 wherein said chamber is coupled to said conduit by a passageway, and wherein said conduit includes a valve seat formed therein and aligned with said passageway, said apparatus further including a valve coupled to said piston and extending through said passageway for selectively engaging said valve seat to close said conduit when said piston is in a position at one end of said chamber.

4. The apparatus as defined in claim 3 and further including actuator means coupled to said piston and extending from said housing and wherein said sensor means comprises a switch with a control element moved by said actuator means to change the state of said switch.

5. The apparatus as defined in claim 4 wherein said urging means comprises means for coupling a source of pressurized fluid to said chamber on a side of said piston opposite said valve.

6. The apparatus as defined in claim 5 wherein said conduit includes an inlet portion and an outlet portion axially offset from said inlet portion and wherein said valve seat is formed in said housing to join said inlet and outlet portions.

7. The apparatus as defined in claim 6 wherein said chamber and said passageway extend transversly to said conduit.

8. A leak detector for a valve used in a high pressure chemical injection system comprising:
    a housing including conduit means for coupling to an outlet of a valve such that fluid passing through the valve will enter said conduit, said housing including a piston chamber and a passageway coupling said piston chamber to said conduit;
    piston means movably positioned in said chamber and including actuator means on a side opposite said passageway and extending from said housing, said piston being movable in said chamber in response to the entry of a non-compressible fluid in said conduit; and
    sensor means coupled to said housing and positioned to respond to movement of said actuator means for providing an alarm output signal.

9. A leak detector for a valve used in a high pressure chemical injection system comprising:
    a housing including conduit means for coupling to an outlet of a valve such that fluid passing through the valve will enter said conduit, said housing including a passageway extending into communication with said conduit;
    means movably positioned in said passageway and movable in response to the entry of a non-compressible fluid in said conduit;
    sensor means coupled to said housing and positioned to respond to movement of said movable means for providing an alarm output signal; and
    means coupled to said sensor means and responsive to said alarm output signal for providing an alarm.

10. The apparatus as defined in claim 9 wherein said sensor means comprises a switch and said means coupled to said sensor comprises an electrical alarm circuit.

11. A leak detector for a valve used in a high pressure chemical injection system comprising:
    a housing with conduit means extending between an inlet and an outlet, said inlet and outlet including axially offset portions, said conduit including a valve seat formed in said housing and extending between said axially offset inlet and outlet portions whereby fluid passing through the valve will enter said conduit, said housing further including a chamber communicating with said conduit;
    valve means movably positioned in said chamber and including a portion extending into contact with said valve seat for selectively sealing said inlet from said outlet, said valve means movable in said chamber in response to the entry of a non-compressible fluid in said conduit; and
    sensor means coupled to said housing and positioned to respond to movement of said valve means for providing an alarm output signal.

12. The apparatus as defined in claim 11 and further including means for urging said valve means in a direction opposite said first direction in the absence of pressurized fluid in said conduit.

13. The apparatus as defined in claim 12 and further including piston means coupled to said valve means and including actuator means extending from said housing and wherein said sensor means comprises a switch with a control element moved by said actuator means to change the state of said switch.

14. The apparatus as defined in claim 13 wherein said urging means comprises means for coupling a source of pressurized fluid to said chamber on a side of said piston opposite said valve.

* * * * *

UNITED STATES PATENT AND TRADEMARK OFFICE
CERTIFICATE OF CORRECTION

PATENT NO. : 4,573,343
DATED : March 4, 1986
INVENTOR(S) : Otto A. Huiber

It is certified that error appears in the above-identified patent and that said Letters Patent are hereby corrected as shown below:

Column 4, line 10:
    "downwardly" should be --upwardly--;

Column 5, line 27:
    "porperty" should be --property--;

Column 5, line 27:
    "privlege" should be --privilege--.

Signed and Sealed this

Twenty-sixth Day of August 1986

[SEAL]

Attest:

Attesting Officer

DONALD J. QUIGG

Commissioner of Patents and Trademarks